United States Patent [19]
Taylor et al.

[11] Patent Number: 4,843,573
[45] Date of Patent: Jun. 27, 1989

[54] DISPLAY-BASED COLOR SYSTEM

[75] Inventors: Joann M. Taylor, Beaverton; Paul A. McManus, Sherwood; Gerald M. Murch, Portland; Roxanna F. Rochat; Novia A. Weiman, both of Beaverton, all of Oreg.

[73] Assignee: Tektronix, Inc., Beaverton, Oreg.

[21] Appl. No.: 113,029

[22] Filed: Oct. 26, 1987

[51] Int. Cl.⁴ .......................................... G06F 15/626
[52] U.S. Cl. .................................... 364/521; 358/80; 340/701
[58] Field of Search ...................... 364/518, 521, 522; 340/701, 703; 358/72, 76, 80, 22, 29, 28, 27, 26, 30

[56] References Cited

U.S. PATENT DOCUMENTS

| | | | |
|---|---|---|---|
| 4,379,292 | 4/1983 | Minato et al. | 340/703 X |
| 4,409,614 | 10/1983 | Eichler et al. | 358/76 |
| 4,500,919 | 2/1985 | Schreiber | 358/78 |
| 4,500,972 | 2/1985 | Kuhn et al. | 358/80 |
| 4,719,503 | 1/1988 | Craver et al. | 358/13 X |
| 4,769,695 | 9/1988 | Terashita | 358/80 X |

Primary Examiner—M. H. Paschall
Assistant Examiner—A. Jonathan Wysocki
Attorney, Agent, or Firm—Patrick W. Hughey; Robert S. Hulse

[57] ABSTRACT

A method and apparatus for reversibly transforming color, which is selected from a gamut of colors producible by the primaries of a color display device (20), into a perceptually uniform color space. The coordinates of the color space are readily convertible into internationally accepted standards for color measurement. Also provided, is a method for transforming the color space coordinates of a selected color into the corresponding relative primary intensity levels of the display device (20).

8 Claims, 4 Drawing Sheets

DISPLAY-BASED COLOR SYSTEM

TECHNICAL FIELD

This invention pertains to color display devices, and particularly to a system for reversibly transforming any of the gamut to colors of a display device into a perceptually uniform color space that is based upon internationally accepted colorimetric parameters.

BACKGROUND INFORMATION

The accurate control and specification of color in color display devices in important to those who utilizes color displays. Part of the effort to meet these control and specification needs has been the development of color spaces that describe, in some useful way, the gamut of color that can be produced by the particular display device. The coordinates of the color space are made available to the user for selection of the coordinates that correspond to a particular color.

One widely used color space, known as the video RGB color system, is employed with a cathode-ray tube (CRT) color display. The video RGB color system is directly related to the hardware of the CRT display, namely, the three electron guns that are used to address the three primary color phosphors ("primaries") carried on the CRT screen. The three primary phosphors emit red, green and blue light, respectively. A CRT display is an additive color system and a gamut of colors can be created by controlling the various intensities of the red, green and blue light emitted by the phosphors. The intensities of the phosphors are controlled by altering the beam current of the corresponding electron gun.

The video RGB color system is represented as a cube-shaped color space having a black point at one corner and a white point at the diagonally opposing corner. The black point corresponds to the absence of emissions from all three phosphors; the white point being the combined full intensity of all three phosphors as excited by the three electron guns. Emanating from the black point in a mutually orthogonal relationship (i.e., in a cartesian coordinate system) are three axes respectively corresponding to the red, green and blue phosphor intensities. Each axis terminates at the full intensity of the associated phosphor. Each axis carries coordinates commonly referred to as "DAC values", which are numerical values corresponding to the electron gun control level required to drive the associated phosphor as a particular intensity. DAC values can be specified to generate any color of the space.

The video RGB system is widely used because it is based upon the hardware (electron guns and associated drive circuitry) employed for creating the color display. However, it is important to note that the video RGB system does not provide perceptually uniform color space. That is, at various locations within the space, a selected change in the DAC values will not necessarily result in a commensurate perceived change in the displayed color. For example, changing the DAC values to move n units in one region of the space may result in no perceived color change, while a move of n units in another region of the space may yield a substantial perceived change. The perceptual nonuniformity of the video RGB system is a result of the nonlinearity of human vision in perceiving the color spectrum. The effect of the perceptual nonuniformity of the video RGB system is that it is difficult for the user to predict what color will appear for any given change in DAC values.

In the past, numerous efforts have been made to develop useful perceptually uniform color spaces for faciliating color specification tasks. Many efforts to develop perceptually uniform color spaces have also been directed to correlating the color spaces to internationally accepted standards for color measurement so that the color can be accurately communicated and consistently reproduced. The most prominent international standards for color measurement are collectively termed the CIE system (Commission International de l'Eclairage or International Commission on Illumination).

The CIE system is based on the premise that specific perceived colors result from the proper combination of an illuminant or reference light source, an object, and an observer. A useful explanation of the CIE system is provided in "Principles of Color Technology", 2nd ed. 1981, by Billmeyer & Saltsman. Generally, the CIE system defines standard light sources having a characteristic spectral power distribution curve. That curve is a depiction of the relative luminous power of the source, i.e., the amount of light associated with each wavelength of the visible spectrum. The CIE system also defins a "standard observer" in terms of three color matching functions. In graphical form, the color matching functions are relative magnitudes of three standard stimuli necessary to produce any color. Any object, the color of which is to be specified, has a characteristic spectral reflectance curve. The reflectance curve is a representation of the fraction of the light reflected from the object at each wavelength. As is known, the product of the spectral power distribution curve for a standard source and the reflectance curve of the object under study, when separately multiplied by each color matching function will, after suitable normalization, yield three curves, the area under each curve corresponding respectively to the CIE tristimulus values XYZ. The values of the standard stimuli that define the color matching functions are such that the color matching function corresponding to the Y tristimulus value represents the human eye response to the total power of the light (i.e., luminance) reaching the eye. Accordingly, the tristimulus value Y provides an indication of the luminance of the color.

The CIE tristimulus values have been converted to a two-dimensional map of colors known as the 1931 CIE chromaticity diagram. The 1931 diagram is shown in FIG. 1 and includes a horseshoe-shaped spectrum locus with the spectral colors identified on the locus by their wavelengths. The coordinates of the chromaticity diagram are known as chromaticity coordinates x and y, and are derived by taking the ratios of the respective X and Y tristimulus values to the sum of all three tristimulus values X, Y and Z. The x and y chromaticity coordinates for any real color are located within the bounds of the spectrum locus and the line that joins the ends of the spectrum locus.

The x and y coordinates do not completely described a color because they contain no information on the inherent luminance of a color. As noted, the Y component of the tristimulus values is a measure of the luminance of the color. Accordingly, a three-dimensional color specification system is created by adding a third axis to the 1931 diagram which extends upwardly from the xy plane at the x and y coordinates of the source light. The third axis is the Y axis and is scaled in units of luminance. For scaling purposes, it is conventional to normalize the Y values from 0 to 1, representing the full ange from black to white, respectively. At each level of luminance the area of the 1931 diagram, which represents the range of colors that can occur, becomes smaller for increasing values of Y and terminates at a single "white point" at the maximum Y value.

The three-dimensional color specification system just described is known as the CIExyY system. In view of the above, it can be appreciated that any real color can be specified in terms of the CIExyY color specification system and directly related to the particular CIE tristimulus values XYZ. The CIExyY system, which is based upon the 1931 CIE chromaticity diagram (and related tristimulus values YXZ), is a widely accepted method for specifying color. Further, the 1931 diagram or, more typically, data derived therefrom, is valuable because it can be used to predict the additve mixture of two or more colors. That is, tristimulus values of component colors mathematically add to yield the tristimulus values of the resulting mixed color.

Efforts have been made to transform the CIE color specification system into perceptually uniform color spaces, while preserving the additive mixing feature of the 1931 CIE chromaticity diagram.

One such transformation of the 1931 diagram includes a two dimensional uniform chromaticity diagram (known as the CIE 1976 UCS diagram), having u' and v' coordinates that approximately a perceptually uniform color plane. The coordinates are known as the uniform chromaticity coordinates and are directly related to the x and y chromaticity coordinates (hence, to the YXZ tristimulus values) as follows:

$$u' = 4x/(-2x+12y+3) = 4X/(X+15Y+3Z) \quad (1)$$

$$v' = 9y/(-2x+12y+3) = 9Y/(X+15Y+3Z) \quad (2)$$

As described, in the referenced text by Billmeyer and Saltzman, the 1976 UCS diagram defined by he u' and v' coordinates has been mathematically converted into a color space that closely approaches perceptual uniformity and is known as the CIELUV color space.

The CIELUV space is characterized by u*,v* coordinate axes. These axes were defined with the achromatic colors at the origin (u*=0,v*=0) by subtracting the uniform chromaticity values u'$_n$ and v'$_n$ for the source light from those of the selected color.

The third coordinate of the CIELUV space, L*, known as the metric lightness function, lies perpendicular to the u*v* plane and intersects that plane at the origin. The L* axis is the axis of the achromatic colors (black, grey and white) and denotes variations in the lightness from L*=0 (black) to L*=100 (white).

As noted, all of the coordinates of the CIELUV space are directly related, via the CIExyY system to the CIE tristimulus values. These relationships are defined below:

$$L^* = 116(Y/Y_n)^{\frac{1}{3}} - 16; \text{ for}$$

$$Y/Y_n > 0.008856 \quad (3)$$

$$L^* = 903.3(Y/Y_n); \text{ for}$$

$$Y/Y_n \leq 0.008856 \quad (4)$$

where
Y = tristimulus value (luminance) of a color, and
$Y_n$ = luminance of the reference light source $$u^* = 13L^*(u' - u'_n) \quad (5)$$

$$v^* = 13L^*(v' - v - n) \quad (6)$$

where u'$_n$ and v'$_n$ are the uniform chromaticity coordinates for the reference light source.

The modified cube-root function for L* as shown above, yields a perceptually uniform scaling of lightness. It is common to refer to the visual sensation of lightness as value.

Hue is defind in the CIELUV color space as the angle made relative to the positive u* axis. The hue angle, h*, is defined as follows:

$$h^* = \arctan(v^*/u^*) \quad (7)$$

A third notation, known as the psychometric chroma $C^*_{uv}$, is adopted in conjunction with the CIELUV color space as a numerical representation of the chroma of a color. Chroma describes the saturation or vibrancy of a color, which is its distance from the L* axis at a particular level of lightness or value. Accordingly, the notation $C^*_{uv}$ relates to the u*, v* coordinates, as follows:

$$C^*_{uv} = (u^{*2} + v^{*2})^{\frac{1}{2}} \quad (8)$$

The CIELUV space is the most nearly perceptually uniform space developed thus far. Particularly, away from the boundaries of the space, equal physical distances along any given dimension of hue, lightness, or chroma are representative of substantially uniform perceived color differences. As an example, it is convenient to examine a circle of hues taken at a constant of lightness and chroma. Color pairs sampled from this hue circle, that are 5° apart from one another will be perceived as having the same magnitude of color difference, regardless of the hue family or overall position in the color space. The color difference, $\Delta E_{uv}$, can be quantified in terms of the CIELUV coordinates as follows:

$$\Delta E_{uv} = [(\Delta L^*)^2 + (\Delta v^*)^2 + (\Delta u^*)^2]^{\frac{1}{2}} \quad (9)$$

wherein the values ΔL*, Δu* and Δv* represent the magnitude of the differences between those coordinates for the color pair.

It can be appreciated that the theoretical advantages of the CIELUV system can be effectively exploited by one interested in specifying a color from it if there is provided a useful method for reversibly transforming conventional color space coordinates, such as the video RGB system coordinates, into the CIELUV coordinates. Further, it has been found that for color displayed by a CRT, modification of the CIELUV color space is desirable to produce a new color space with enhanced perceptual uniformity, and which is defined by the actual gamut of colors that can be produced by the CRT.

SUMMARY OF THE INVENTION

This invention is directed to a method for reversibly transforming a color, which is selected from the gamut of colors producible by the primaries of a color display device, into a perceptually uniform color space, the coordinates of the space being readily convertible into internationally accepted standards for color measurement. To this end, a new perceptually uniform color space having H, V and C coordinates is defined.

The new color space, referred to as the HVC space, is constructed to provide enhanced perceptual uniformity over prior color spaces. The H and V coordinates substantially correspond to the CIELUV hue angle and metric lightness function, respectively. However, the coordinate C, representing the chroma of the color, comprises a substantially modified version of the CIELUV chroma coordinate $C^*_{uv}$. It has been found that the HVC color space exhibits greatly improved perceptual uniformity over the CIELUV space because the coordinate C is scaled to correspond to the metric lightness function $L^*$ of the CIELUV space, and further adjusted with a chroma factor $C_f$, which defines the boundaries of the C coordinate within the maximum achievable chroma values of the CRT. The V and C coordinates are so related that a change of n units in the V coordinate wil produce a perceived color difference substantially equal to the difference resulting from a change of n units made in the C coordinate and vice versa. As a result, the HVC space offers enhanced predictability for color selection.

In view of the above, there is provided a method for transforming into the HVC color space any color selected from the color gamut of a display device, wherein the selected color is definable by a primary intensity vector comprising relative luminous intensity values of each of the display primaries. The method includes generating a matrix for converting primary intensity vectors into corresponding YXZ tristimulus values, and multiplying the primary intensity vector of the selected color by the matrix to yield the tristimulus values $X_s$, $Y_s$ and $Z_s$ of the selected color. Next computed are the $L^*$, $u^*$ and $v^*$ coordinates fo the CIELUV system corresponding to the $X_s$, $Y_s$, and $Z_s$ tristimulus values. The selected point is then transformed into the perceptually uniform color space coordinates H, V and C described above. The $X_s$, $Y_s$ and $Z_s$ values are also used to calculate the corresponding CIExyY coordinates for specification of the selected color in terms of those internationally accepted color measurement standards.

As another aspect of this invention, a method is provided for transforming the H, V and C coordinates of a selected color, into the corresponding primary intensity vector of the selected color.

DETAILED DESCRIPTION OF THE PREFERRED EMBODIMENT

Figure 1:
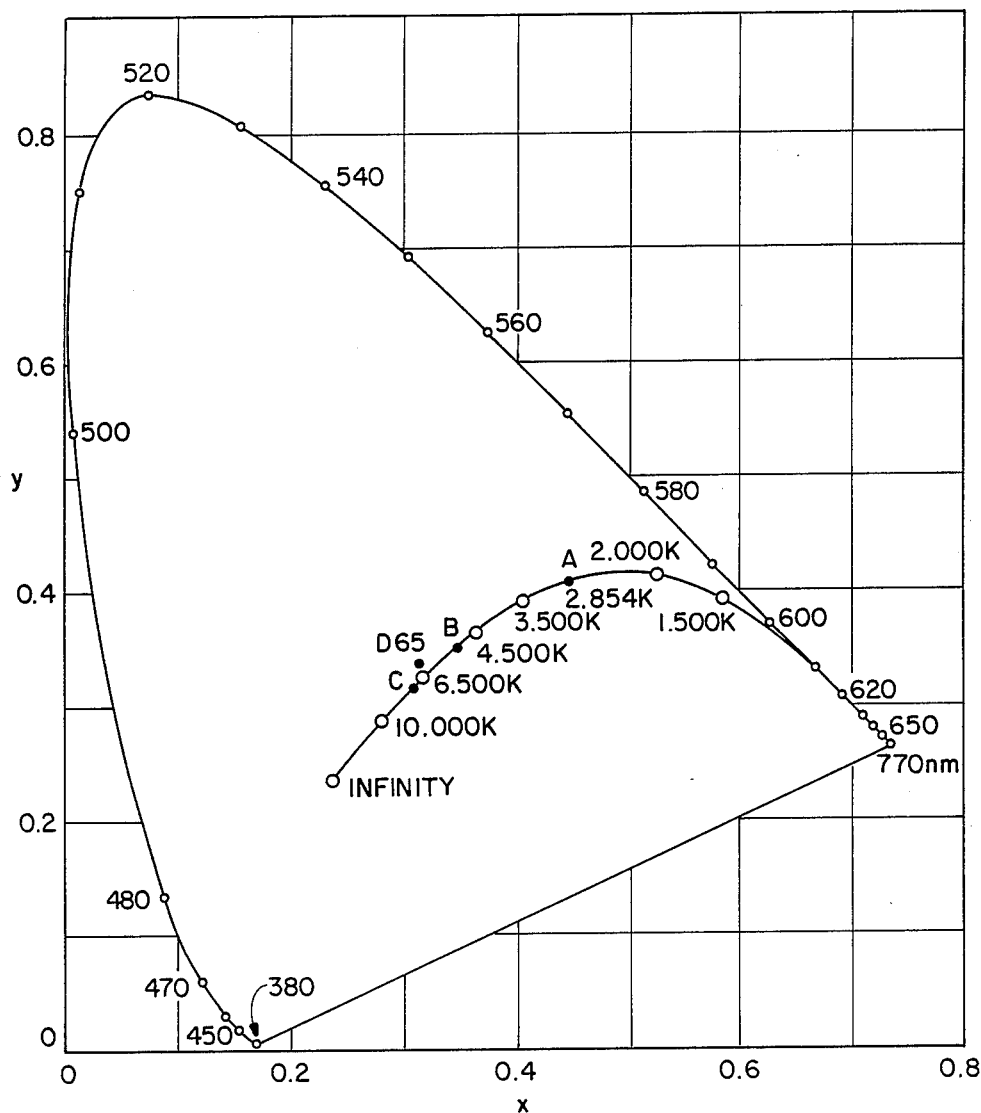
FIG. 1 is the 1931 CIE chromaticity diagram.
Figure 2:
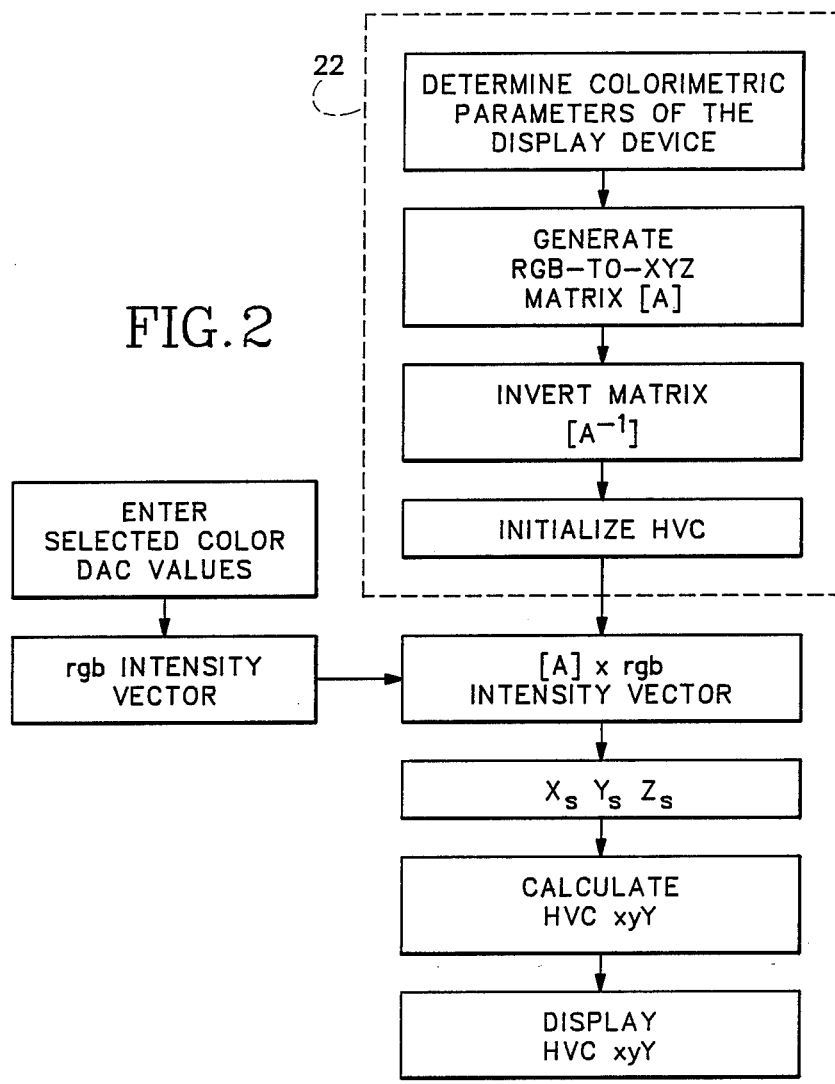
FIG. 2 is a flow chart illustrating the implementation of the HVC color space and the transformation of the primary intensity vector of a selected color into the coordinates of the HVC space.
Figure 4:
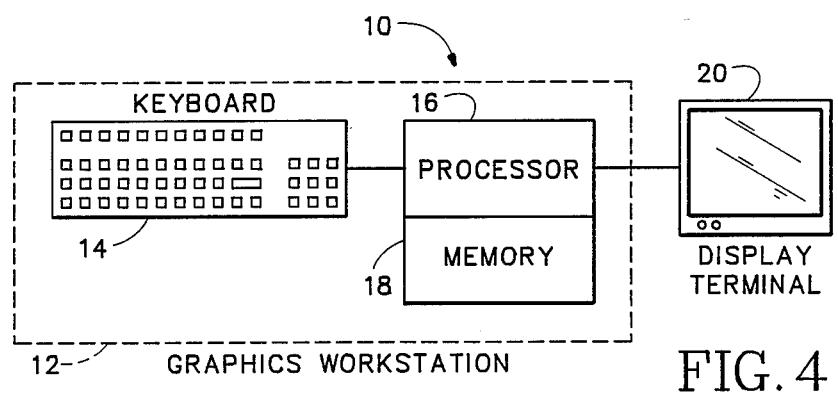
FIG. 4 is a block diagram of a graphics workstation and display terminal useful for implementation and manipulation of the HVC color space.

FIG. 2 illustrates the sequence of steps for transforming any selected color, producible by a CRT color display, into a perceptually uniform color space that is based upon internationally accepted colorimetric standards. The perceptually uniform space will hereafter be referred to as the HVC space having coordinates H, V and C, the numerical values of which are described more fully below. The display-based HVC space of the present invention can be implemented in any of a variety of graphics display systems such as the 4335 Color Graphics Workstation and the 4235 Graphics Terminal available from Tektronix, Inc., Beaverton, Oreg. A graphics display system is shown in the block diagram of FIG. 4. Essentially, the graphics display system 10 includes a workstation 12 comprising input device 14, and a programmable processor 16 with associated memory 18. A video monitor or display terminal 20 is associated with the workstation.

Referriang to FIG. 2, a preliminary step in carrying out the transformation process is to determine the colorimetric parameters of the display device. To this end, data corresponding to the CRT phosphor characteristics is compiled. This data is a tabulation of the luminous intensity levels of the red, green and blue phosphors that correspond to each DAC value. In RGB video space, DAC values are often defined in one unit increments ranging from 0–255, each DAC value being a numerical representation of the particular electron gun control level for igniting a phospor. Thus, for example, the DAC-value/intensity table for the red phosphor describes the intensity level profile for each red electron gun control level. The DAC-value/intensity data may be that specified by the CRT manufacturer; however, for application requiring precise color control it is preferred that the DAC-value/intensity data be measured and periodically updated via suitable spectroradiometric means.

The DAC-value/intensity tables are normalized to 1 and stored in the memory 18 of the graphics workstation 12.

In addition to the DAC-value/intensity data, the CIE XYZ tristimulus values for each primary phosphor are obtained for a reference white color that is produced by the CRT. Preferably, this tristimulus data is normalized so that the Y tristimulus value of the reference white will equal 1. As noted, the Y tristimulus value indicates the luminance of the color. Establishing the Y value at 1 will yield a corresponding scaling of the CIELUV metric lightness function $L^*$ at a maximum value 100, which corresponds to the reference white of the display device.

Once normalized, the tristimulus data is arranged in a RGB-to-XYZ matrix, denoted [A]. The RGB-to-XYZ matrix elements represents the relative intensity contributions of the red, green and blue phosphor (columns) to the X, Y and Z values (rows) of the reference white.

The RGB-to-XYZ matrix is next inverted to form an XYZ-to-RGB matrix, denoted $[A^{-1}]$, the significance of which is described more fully below.

Figure 5:
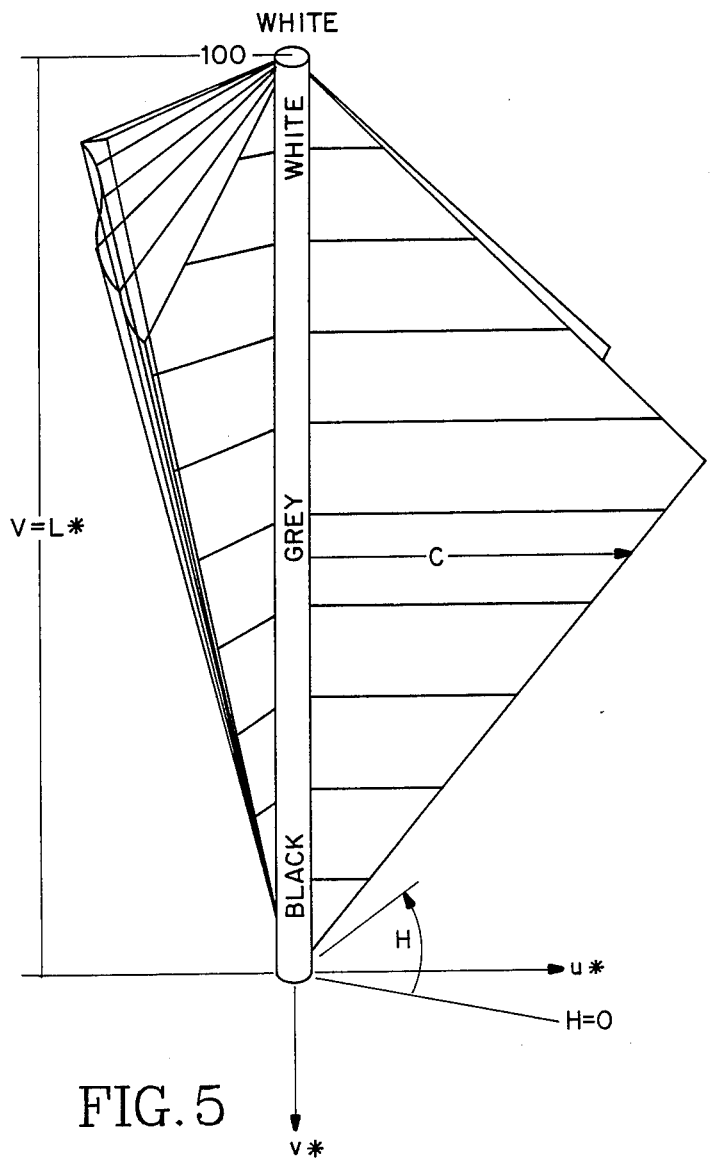
FIG. 5 is a representation of an HVC color space for a particular CRT display device.

With continued reference to FIG. 2, the HVC space is next initialized. That is, the constants and functions for defining the H, V and C coordinates of the HVC space are established for the particular CRT. Specifically, with reference to FIG. 5, the vertical axis, V, of the HVC space is defined as corresponding to the CIELUV metric lightness function $L^*$ or $$V = L^* \tag{10}$$

Accordingly, for any selected color producible by the CRT, upon determination of the corresponding tristimulus value Y, the V coordinate is determined through use of equations (3) and (4), substituting V for L*.

The H coordinate of the HVC space generally corresponds to the CIELUV hue angle and is assigned a range of integer values from 0 to 359 corresponding to 1° counterclockwise angular increments in the CIELUV u*v* plane. The vertex of the hue angle is aligned with the V axis. The H coordinate is the integer value of the hue angle and is calculated as:

$$H = (\arctan(v^*/u^*) + K) - H_o \quad (11)$$

where
$K = 0°$ for $u^* > 0°$ and $v^* > 0$;
$K = 90°$ for $u^* < 0$ and $v^* > 0$;
$K = 180°$ for $u^* < 0$ and $v^* < 0$;
$K = 270°$ for $u^* > 0$ and $v^* < 0$;

the constant $H_0$ is selected to establish the 0 value or origin of H at the color most commonly associated with the term "red". In this regard, establishing H=0 at approximately −13°, plus or minus 2°, relative to the positive u* axis of the CIELUV color system corresponds to the hue angle of a red that conforms in name to many conventional color-order systems. Color-order systems such as the well-known Munsell book of color, employ a collection of physical samples to identify various hues. Color-order systems should not be confused with the CIE color specification system. It is contemplated that the H origin may be established at colors other than red.

In view of the above, it can be appreciated that for any selected color producible by the CRT, upon determination of the corresponding tristimulus values XYZ, and transformation of those values into the CIELUV L*, u* and v* coordinates via equations (5) and (6), the H coordinate of the HVC space can be computed with equation (11).

An important apsect of the HVC space is that the chroma coodinate C correlates to the gamut of colors that can be produced by the CRT, and is scaled to correspond to the value or V coordinate of the space. In short, the CIELUV chroma calculation $C^*_{uv}$ is modified by multiplying that chroma by the value coordinate V for the selected color and by a chroma factor $C_f$, which is a function of the maximum obtainable chroma for a given CRT phosphor set.

Accordingly, the C coordinate is calculated as:

$$C = C^*_{uv}(V)(C_f) \quad (12)$$

It has been found that the C coordinate defined above provides a more perceptually uniform CRT-based color space than heretofore available and offers greatly enhanced predictability in color selection. In this regard the C coordinate is numerically scaled from 0 to 100, with 100 equated to the maximum chroma or C level providable by the CRT. The scaling is achieved by defining the chroma factor $C_f$ as:

$$C_f = 100/\text{maximum chroma } C^*_{uv} \text{ for CRT} \quad (13)$$

Multiplying the CIELUV chroma $C^*_{uv}$ for a selected color by the chroma factor $C_f$ and by the V coordinate of the HVC space enhances the perceptual uniformity of the HVC space so that at any hue H, a change of n units in the C coordinate will produce a perceived color difference substantially equal to the perceived color difference that occurs if the change of n units is made in the V coordinate. Likewise, for any hue H, a change of n units in the V coordinate will produce a perceived color difference substantially equal to the perceived color difference that occurs if the change of n units is made in the C coordinate.

To determine the maximum chroma $C^*_{uv}$ producible by the CRT (and thereafter calculate the chroma factor $C_f$) the u* and v* coordinates of the red, green and blue phosphor vertices are computed. A phosphor vertex is the point in the color space correspondiang to the full intensity of one phosphor with the intensities of the remaining phosphors being zero. Typically the red phosphor vertex has the greatest $C^*_{uv}$ level. The following calculation of the red phosphor vertex is provided to illustrate how all phosphor vertices are calculated.

The calculation of the red vertex involves creation of a single column, three-rwo, red-rgb matrix, denoted [r]. The red-rgb matrix elements represent the full intensity DAC value (normalized to 1) for the red phosphor, and 0 DAC values for the green and blue phospors. Multiplication of the red-rgb matrix by the RGB-to-XYZ matrix [A] yields a red-XYZ matrix [R], the elements of which are the tristimulus values $X_r$, $Y_r$, $Z_r$ resulting from the full intensity red phosphor. In equation form:

$$[R] = [A][r], \text{ or } \begin{bmatrix} X_r \\ Y_r \\ Z_r \end{bmatrix} = [A] \begin{bmatrix} 1 \\ 0 \\ 0 \end{bmatrix} \quad (14)$$

Employing similar notation for the green and blue phosphors yields:

$$[G] = [A][g], \text{ or } \begin{bmatrix} X_g \\ Y_g \\ Z_g \end{bmatrix} = [A] \begin{bmatrix} 0 \\ 1 \\ 0 \end{bmatrix} \quad (15)$$

and $$[B] = [A][b], \text{ or } \begin{bmatrix} X_b \\ Y_b \\ Z_b \end{bmatrix} = [A] \begin{bmatrix} 0 \\ 0 \\ 1 \end{bmatrix} \quad (16)$$

The CIE uniform chromaticity coordinates u', v' are next calculated for each vertex using equations (1) and (2). The $u'_n$ and $v'_n$ pair for the reference white is then calculated based on the previously-determined XYZ values of the reference white. Finally, the lightness function L* is calculated for each vertex. By way of example, the lightness L* of the red vertex is determined by multiplying the RGB-to-XYZ matrix by the $Y_r$ row of the red-XYZ matrix to yield the $Y_{vr}$ tristimulus value corresponding to the red vertex or:

$$Y_{vr} = [A]Y_r$$

Incorporating $Y_{vr}$ into equations (3) and (4) yields the value of the metric lightness function $L^*_{vr}$ of the red vertex. Similar calculations yield $L^*_{va}$ and $L^*_{vb}$ values for the green and blue phosphor vertices respectively.

Given the above values of u', v', $u'_n$, $v'_n$ and L* for each phosphor vertex, the u* and v* coordinates for each vertex are then calculated using equations (5) and (6).

For each phosphor vertex, the CIELUV chroma is then calculated according to equation (8). The maximum CIELUV chroma $C^*_{uv}$ of all vertices is then selected and used in equation (13) to determine the chroma factor $C_f$.

With the HVC space initialized as just described, this discussion now turns to the method for transforming a color selected from a gamut of colors producible by a CRT display device into the coordinates of the HVC space. First, a color is selected by providing the data designating the red, green and blue phosphor intensity combination that would yield the desired color. As noted earlier, the DAC values of the video RGB system are typically used for such a designation. The DAC values are provided to the workstation processor 14 by any of a variety of input devices such as the depicted keyboard 16.

The DAC values of the selected color form a 3-element rgb intensity vector. Each element of the vector denotes the relative intensity contribution of each phosphor in creating the selecting color. The rgb intensity vector is next multiplied by the above-described RGB-to-XYZ matrix [A] to yield the CIE tristimulus values $X_s$, $Y_s$, $Z_s$ for the selected color. The $X_s$, $Y_s$, $Z_s$ values are then conerted into the HVC coordinates as described above with reference to equations (10), (11) and (12). Preferably, the coordinates of the HVC space are then displayed on a display terminal 20, or otherwise made available for reference by the user. Further, the corresponding CIE colorimetric parameters x, y and Y are also provided to the user to permit specification of the selected color in accordance with those internationally accepted standards.

Figure 3:
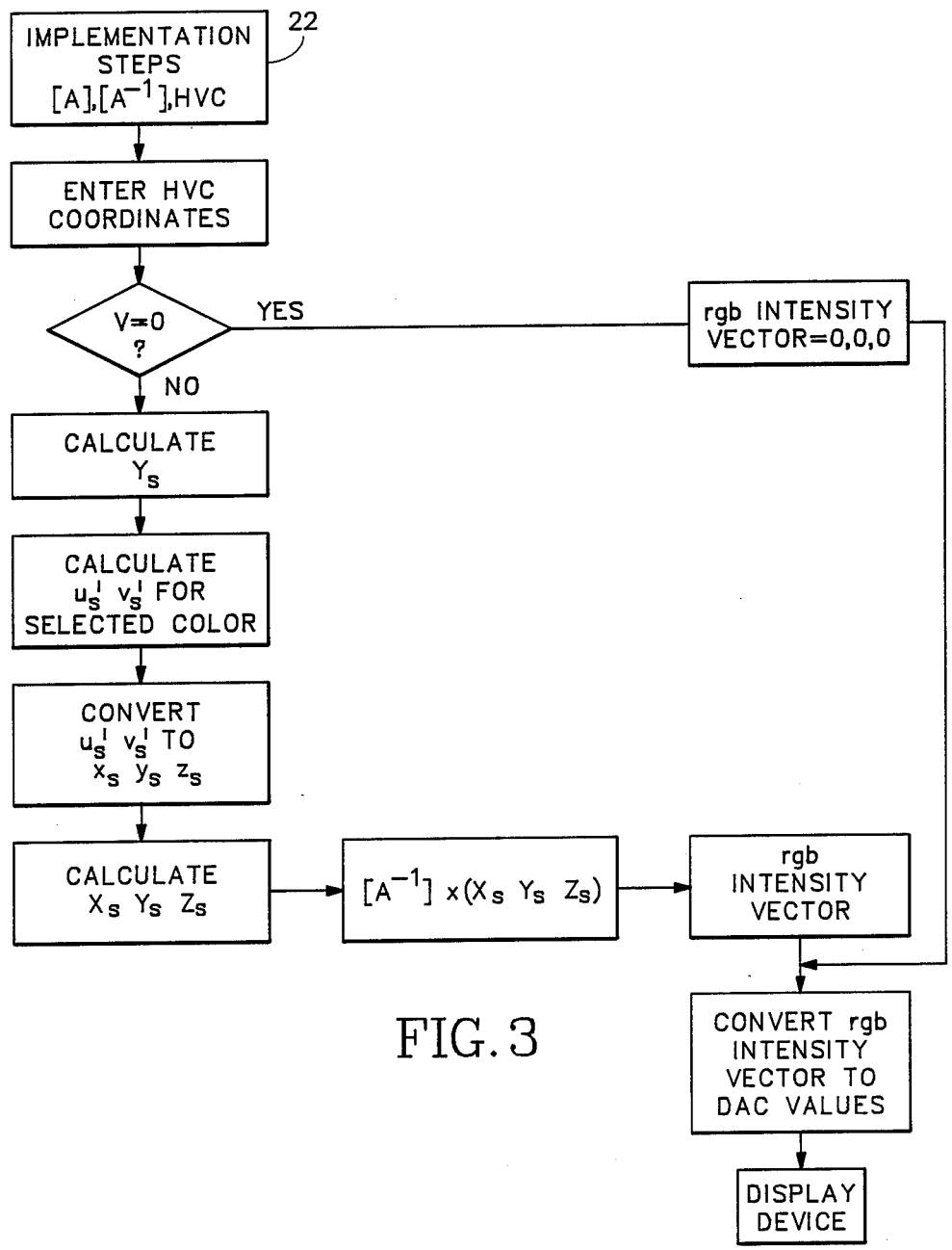
FIG. 3 is a flow chart illustrating the transformation of the H, V and C coordinates of the selected color to a corresponding primary intensity vector.

Referring to FIG. 3, now discussed is the method for transforming the H, V and C coordinates of a selected color to the corresponding rgb intensity vector employed for displaying the selected color on the CRT display device.

The implementation steps described above and shown as block 22 in FIGS. 2 and 3 are performed in the present transformation. In this regard, it is noteworthy that the implementation steps need only be undertaken once for each display device although greater precision is possible if the colorimetric parameters of the device are frequently recalibrated.

The H, V and C coordinates of the selected color are entered into the processor 16 of the graphics workstation 12 by a suitable input device such as the depicted keyboard 14. The V coordinate is immediately checked to determine if the black point has been selected (i.e., lightness or "value" V=0). If the black point has been selected, an appropriate rgb intensity vector is generated (i.e., all elements=0) and supplied to the CRT display device to display the black color as described more fully below.

If the black point is not selected, the tristimulus value $Y_s$ is calculated for the selected point. In this regard, it is noted that upon review of equations (3) and (4), it is clear that equation (3) is solved for $Y_s$ if the selected V coordinate is less than 8 (recalling that V=L*) otherwise equation (4) is employed.

The uniform chromaticity coordinates $u'_s v'_s$ are next calculated for the selected color. To this end, the distance from the known reference white point $u'_n$ and $v'_n$ is determined. This distance, D, is the CIELUV $C^*_{uv}$ level. Accordingly, the distance $D=C/((C_f)(V))$.

The u' axis component and v' axis component of the distance, D, is then calculated using the hue angle, which, as seen in equations (7) and (11), is the sum of the selected coordinate H and $H_0$. Accordingly, the $u'_s v'_s$ coordinates of the selected point are calculated as follows:

$$u'_s = u'_n + D(\cos(H+H_0)) \quad (17)$$

$$v'_s = v'_n + D(\sin(H+H_0)) \quad (18)$$

The $u'_s$, $v'_s$ coordinates of the selected point are then employed to determine the tristimulus values of the selected point. Specifically, the values x and y are calculated using equations (1) and (2) and the calculated values of $u'_s$ and $v'_s$.

Further, the z chromaticity coordinate is determined as $$z = 1.0 - x - y. \quad (19)$$

With the selected $Y_s$ as calculated above, $$X_s = x(Y_s/y) \text{ and} \quad (20)$$

$$Z_s = z(Y_s/y). \quad (21)$$

As indicated in FIG. 3, the selected $X_s X_s Z_s$ tristimulus values are next multiplied by the XYZ-to-RGB matrix $[A^{-1}]$ to obtain the corresponding rgb intensity vector.

The rgb intensity vector is converted to DAC values by reference to the stored DAC-value/intensity tables. The DAC values corresponding to the selected color are applied to conventional digitial-to-analog converters, corrected for gamma, and fed to the electron guns for displaying the selected color on the CRT display.

While a preferred embodiment of the invention has been illustrated and described, it will be appreciated that various changes can be made therein without departing from the spirit and scope of the invention. In this regard, it is contemplated that the HVC space can be implemented with any color display device having any number of primaries for producing a color. For example, a fourth primary, such as yellow, may be employed with certain flat panel-type display devices. The calculations described above are readily adaptable to incorporate any number of primaries.

We claim:

1. A method for defining an improved perceptually uniform color space for a display device, the improved perceptually uniform color space having coordinates H, V, and C, which are based upon CIELUV coordinates L*, v* and u*, the method comprising the steps of:
    (a) determining the maximum CIELUV chroma $C^*_{uv} = (u^{*2} + v^{*2})^{\frac{1}{2}}$ producible by a display device that has a plurality of color-producing primaries, the luminous intensity of the primaries being adjustable between minimum and maximum levels to produce a gamut of colors;
    (b) establishing a maximum numerical value for the C coordinate;
    (c) dividing the maximum C value by the determined maximum CIELUV chroma to yield a chroma factor $C_f$; and
    (d) defining the improved color space coordinates as:

$$H = \arctan(v^*/u^*) + K,$$

where
K=0° for u*>0 and v*>0;

$K=90°$ for $u^*<0$ and $v^*>0$;
$K=180°$ for $u^*<0$ and $v^*<0$;
$K=270°$ for $u^*>0$ and $v^*<0$;

$V=L^*$;

$C=C^*_{uv}(V)(C_f)$.

2. The method of claim 1 wherein step (a) includes determining the CIELUV chroma for each of the plurality of primaries, wherein the primary for which the CIELUV chroma is determined is adjusted to the maximum intensity level and the remaining primaries are adjusted to the minimum intensity level.

3. The method of claim 1 wherein the maximum numerical value for C is established as 100.

4. The method of claim 1 wherein step (d) includes the substep of subtracting from the H value a value $H_0$ in the range of $-11°$ to $-15°$.

5. A method for defining a selected color in terms of a perceptually uniform color space that is described by H, V, and C coordinates, the method comprising the steps of:
(a) selecting a color that is defined by a primary intensity vector, which vector denoting the relative values of the luminous intensities of a plurality of primaries, each primary being adjustable to produce a range of luminous intensity levels;
(b) generating a matrix for converting the primary intensity vector into corresponding XYZ tristimulus values;
(c) multiplying the primary intensity of the selected color by the matrix to yield corresponding tristimulus values $X_s$, $Y_s$, $Z_s$;
(d) computing the CIELUV system coordinates $L^*$, $u^*$, $v^*$ that correspond to the tristimulus values $X_s$, $Y_s$ and $Z_s$;
(e) computing the H coordinates as $H=\arctan(v^*/u^*)+K$, where
$K=0°$ for $u^*>0$ and $v^*>0$;
$K=90°$ for $u^*<0$ and $v^*>0$;
$K=180°$ for $u^*<0$ and $v^*<0$;
$K=270°$ for $u^*>0$ and $v^*<0$;
(f) computing V as $V=L^*$;

(g) computing $C_f$ as $100/C^*_{uvmax}$, where $C^*_{uvmax}$ is the maximum numerical value of the CIELUV system chroma $C^*_{uv}$ producible by the primaries; and
(h) computing C as $C=(v^{*2}+u^{*2})^{\frac{1}{2}}(V)(C_f)$.

6. The method of claim 5, wherein step (e) further includes subtracting from H a value $H_0$, wherein $H_0$ is in the range of $-11°$ to $-15°$.

7. A system for defining a color selected from a gamut of colors producible by a color display device in terms of a perceptually uniform color space that is described by H, V and C coordinates, the system comprising:
(a) a display device having a plurality of primaries each primary variable between a minimum and maximum luminous intensity level for producing a color that is defined by a primary intensity vector denoting the relative values of the primary intensity levels;
(b) input means for receiving and storing data corresponding to the primary intensity vector of the color;
(c) processing means for
(1) generating a matrix for converting primary intensity vectors into corresponding XYZ tristimulus values;
(2) multiplying the primary intensity vector of the color by the matrix to yield the tristimulus values $X_s$, $Y_s$, $Z_s$ of the color;
(3) determining the $L^*$, $u^*$ and $v^*$ coordinates of the CIELUV system that correspond to the tristimulus values $X_s$, $Y_s$ and $Z_s$; and
(4) computing the H, V and C coordinates as:

$H=(\arctan(v^*/u^*)+K)-H_0$, where
$K=0°$ for $u^*>0$ and $v^*>0$;
$K=90°$ for $u^*<0$ and $v^*>0$;
$K=180°$ for $u^*<0$ and $v^*<0$;
$K=270°$ for $u^*>0$ and $v^*<0$;
$-11°\leq H_0 \leq -15°$;
$V=L^*$;
$C=(v^{*2}+u^{*2})^{\frac{1}{2}}(V)(C_f)$ where $C_f=100/C^*_{uvmax}$, wherein $C^*_{uvmax}$ is a maximum numerical value of the CIELUV chroma $C^*_{uv}$ producible by the primaries of the display device.

8. The apparatus of claim 7 wherein the processing means comprises a programmable data processor.

* * * * *